United States Patent [19]
Odenwald

[11] 3,771,252
[45] Nov. 13, 1973

[54] FISHING LINE SINKER
[76] Inventor: William S. Odenwald, 15704 S. Paulina Ave., Harvey, Ill. 60426
[22] Filed: June 19, 1972
[21] Appl. No.: 263,973

[52] U.S. Cl. .............................................. 43/44.97
[51] Int. Cl. .......................................... A01k 95/00
[58] Field of Search ...................... 43/44.97, 42.72, 43/43.1

[56] References Cited
UNITED STATES PATENTS
| | | | |
|---|---|---|---|
| 1,182,822 | 5/1916 | Volk | 43/44.97 |
| 1,250,053 | 12/1917 | Tukey | 43/42.72 |
| 3,151,414 | 10/1964 | Hoerner | 43/44.97 |

Primary Examiner—Louis G. Mancene
Assistant Examiner—Daniel J. Leach
Attorney—Charles W. Rummler et al.

[57] ABSTRACT

A fishing line sinker comprising a cylindrical body made of a helical coil of soft non-resilient metal and having a swivel extending axially from one end for attachment of a fish line and for permitting the sinker to roll freely about the coil axis; the coil being capable of being stretched to increase its length and reduce its diameter to permit its being worked free from a snagged condition.

5 Claims, 5 Drawing Figures

PATENTED NOV 13 1973    3,771,252
FIG-1
FIG-2
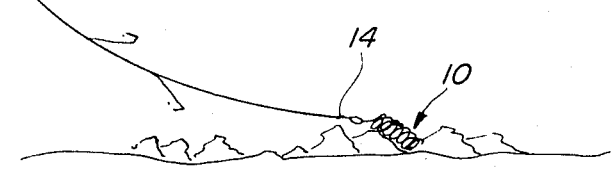
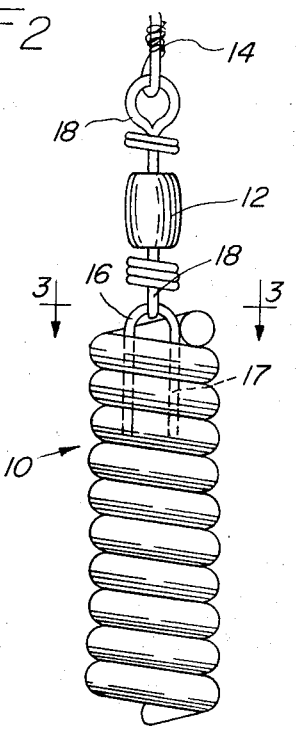
FIG-4
FIG-5
FIG-3
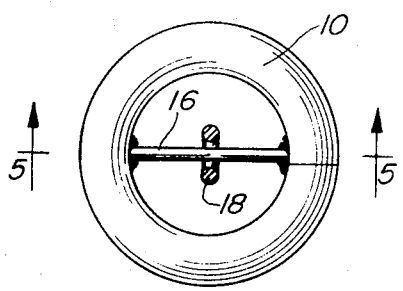
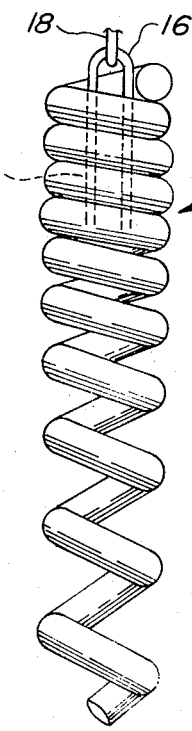
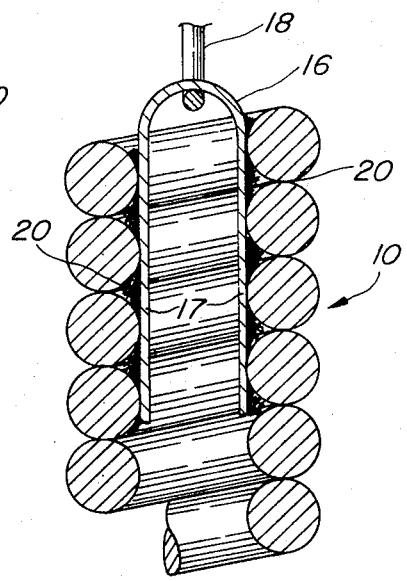

FISHING LINE SINKER

BACKGROUND OF THE INVENTION

Ordinary fish line sinkers, when used in rocky bottomed lakes and streams, often become snagged beneath or among the rocks or on other bottom debris with the result that many times the fishing tackle becomes lost by breakage of the line when attempt is made to pull the sinker loose from its lodgment. Such snagging of the sinker can occur in calm water as well as in strong river currents when the sinker settles to bottom, particularly when the fishing tackle is being pulled through the water.

I have found, however, that when the sinker is of a form and mass that will allow a rolling action when on the river or lake bottom, the likelihood of snagging is greatly reduced. Also, if the sinker is of a kind that will stretch or change its length and diameter, as well as roll, I have found it to have a greater tendency to work free from a snagged situation, when the fishing line is played by pulling and then releasing it in the usual manner.

It is a primary object of my present invention, therefore, to provide an improved fish line sinker of simple low cost construction that includes the features and capabilities before mentioned and at the same time efficiently performs its primary line-weighting function.

SUMMARY OF THE INVENTION

My improved fishing line sinker preferably comprises a coil of soft tractable metal wire, such as a tin-lead composition solder, wound in a tight spiral with axially successive convolutions in substantially face-to-face engagement to form a generally cylindrical body. A swivel is attached to one end of the body to extend axially therefrom for attachment of a fishing line or leader and the sinker body is made with a diameter and length to provide the desired weight.

DESCRIPTION OF THE DRAWINGS

FIG. 1 is a view showing the sinker as it could rest on a river or lake bottom to hold a fishing line;

FIG. 2 is an elevational view showing the improved sinker attached to a fishing line;

FIG. 3 is an end view of the sinker as from the line 3—3 of FIG. 2;

FIG. 4 is a view showing how the improved sinker may become stretched while being worked free from a snag; and FIG. 5 is a fragmentary sectional view showing how a swivel may be secured to the coiled body of the sinker.

THE PREFERRED EMBODIMENT

In the form shown the improved fishing line sinker comprises a helical coil 10 made of a relatively heavy soft non-resilient and pliant metal wire such as a soft copper or a standard tin-lead solder wire having a diameter of three thirty-seconds inch wound helically to form a cylindrical body three-eighths inch in diameter and about 1 ½ inches long. This amount of solder wire provides a body weight of about one ounce and is a convenient size for average fishing line weighting use. The body diameter and length may be varied according to the sinker weight desired, bearing in mind, however, that a generally cylindrical body of a length several times its diameter and relatively heavy per unit of mass is desired to afford the lateral rolling action that is so effective in working free from a snag.

The improved sinker is provided with a conventional swivel 12 for attachment to the usual fishing line or leader 14 and the swivel is mounted to the sinker body by means of a U-shaped wire connector 16 which is first hooked through one of the loops 18 of the swivel 12 and then inserted, leg ends first, into the hollow interior of the coil 10 where the legs 17 of the connector are secured to the endmost convolutions of the coil, as indicated in FIG. 5, by epoxy cement 20 or any other suitable means.

In use on the end of a fishing line the sinker functions to provide weight to assist in casting the bait a reasonable distance into the fishing area and to carry the line toward the bottom of the lake or stream. In the event that the sinker is caught by rocks or under water obstructions, the improved device will usually roll away from the obstacle when the line is loosened, particularly if there is any current or the fishing line is being pulled to drag the bait through the water. On the other hand, if the sinker becomes snagged by the underwater obstacles, the fishing line may be pulled or jerked to cause the coils of the sinker to open and stretch axially then, when the line is loosened, the sinker will usually roll away from the obstacle so that it can be readily retrieved by the fisherman. After retrieval, the stretched coils of the sinker can easily be pressed back into shape manually so as to return the sinker to substantially its original shape.

Although but one embodiment of this invention is herein shown and described, it will be understood that details of the construction shown may be altered or omitted without departing from the spirit of the invention as defined by the following claims.

I claim:

1. A fish line sinker comprising a helically wound coil of soft tractable metal wire having a swivel secured to and extending in the axial direction from one end of the coil, the swivel terminating in means for attachment of a fish line thereto, and the coil being capable of being manually stretched and compressed in the axial direction to adjust the spacing of the coil convolutions.

2. A fish line sinker according to claim 1 wherein the coil is made of soft metal wire of about one-tenth inch diameter.

3. A fish line sinker according to claim 2 wherein the coil is wound to have an outside diameter of about three-eighth inch.

4. A fish line sinker as defined by claim 2 wherein the convolutions of the coil are normally spaced apart a distance less than the wire diameter.

5. A fish line sinker according to claim 3 wherein the length of the coil is about 1 ½ inches when the coil convolutions are closed upon each other.

* * * * *